Patented May 2, 1933

1,906,434

UNITED STATES PATENT OFFICE

BERT S. TAYLOR, OF AKRON, OHIO, AND BERNARD M. COSTELLO, OF LOS ANGELES, CALIFORNIA, ASSIGNORS TO THE B. F. GOODRICH COMPANY, OF NEW YORK, N. Y., A CORPORATION OF NEW YORK

CORROSION-RESISTING RUBBER ARTICLE

No Drawing.   Application filed May 7, 1929. Serial No. 361,250.

This invention relates to the art of manufacturing rubber and has as its principal object to provide a method for protecting rubber goods or similar articles from acids, corrosive fumes, etc.

Many elastic articles such as transmission or conveyor belts, hose, boots and shoes, etc. are subjected to the corrosive action of acid fumes. Such articles made of leather or of fabric are very quickly disintegrated and destroyed by acids. Attempts have therefore been made to impregnate and protect the fabric or other reenforcement of such articles with soft vulcanized rubber. The acid, however, penetrates even such rubberized articles and destroys the reenforcing fibers, causing untimely failure. Previous attempts to render such articles acid-proof have failed because the coating did not adhere to the rubber of other base, or because it was not sufficiently elastic and extensible to flex with the base.

This invention consists in coating elastic articles with an intermediate layer of an adhesive and with a protective layer of an elastic, acid-resisting composition. The intermediate layer is preferably a thin coat of a solution of a tough heat-plastic rubber isomer. The final coating may be of any composition which is sufficiently tough and elastic to flex with the base article and at the same time is satisfactorily resistant to corrosion, but is preferably a composition containing a resin and a plasticizing agent mixed with a comparatively large proportion of inert pigments.

The invention will be described with reference to a specific embodiment, namely, an acid-resisting belt such as a power transmission belt or conveyor belt. The belt may be built up in the usual manner by coating successive plies of cotton duck or other stout fabric with a vulcanizable rubber composition, superimposing the plies and vulcanizing the belt under tension in a press. Preferably the exterior surfaces of the belt are not completely covered with rubber, but the fabric is left partially exposed to serve as a base for the layer of adhesives. Such a belt is known in the art as a friction fabric surface belt.

The most satisfactory adhesive for the purpose of this invention has been found to be a tough heat-plastic balata-like rubber isomer, such as that prepared by the reaction of rubber with a sulphonic acid, and described by Harry L. Fisher in the United States Patent No. 1,605,180, granted November 2, 1926. Such rubber isomers have properties varying from those of vulcanized rubber, to those of hard balata, or even of shellac. When purified, they contain only carbon and hydrogen in the same ratio as the rubber from which they were prepared, but are chemically less unsaturated than rubber. They may be prepared by various different methods, of which that disclosed in the above-mentioned patent is an illustration, hence the term "tough, heat-plastic rubber isomers" will hereinafter be employed to include substances which contain carbon and hydrogen in the same ratio as rubber, but which are chemically less unsaturated than rubber, regardless of the particular method by which they are prepared. The adhesive may be softened by heat and rolled on the surface of the belt by a calender, but is preferably applied in the form of a solution. For example, the belt is dipped in a 15% solution in benzol of the tough balata-like heat-plastic rubber isomer described in Fisher's above mentioned patent. The excess may be removed by wiping, leaving a thin film of the rubber isomer on the surface of the belt. The adhesive need not be dried before the application of the protective, acid-resisting layer.

The belt is again dipped in a liquid having approximately the following composition: spar varnish 190 parts by weight, tricresyl-phosphate 4.5 parts, and benzol 174 parts, mixed with clay 35 parts by weight, iron oxide 35 parts, lampblack 3.5 parts, zinc oxide 8 parts, lime 4.5 parts, litharge 2.5 parts, sulphur 9.5 parts, and manganese dioxide 2 parts. The coating is allowed to dry and is preferably aged before the belt is used. Ordinarily one or two weeks will be sufficient, but the resistance of the coating to acids will be improved if it is aged a somewhat longer time.

The finished belt is quite as flexible as the same belt without the acid-resisting coating. The coating is extremely firmly adherent and will not crack, chip, or peel. It protects the belt, and particularly the textile reenforcement against damage by acid fumes long after similar untreated belts have failed because of corrosion and weakening of the fabric. Furthermore, the coefficient of friction of the hereinabove described coating against metal surfaces is comparatively high permitting the coated belts to transmit approximately 50% more power than similar untreated friction fabric surface belts.

The composition of the above acid-proof coating is susceptible of great variations without destroying its valuable properties. The spar varnish which forms the base of the composition is made by heating or "running" a gum-resin such as manila copal, kauri, dammar, shellac, ester gum, etc., adding a drying oil such as linseed oil, perilla oil, chinawood oil, etc. and thinning with a volatile solvent such as turpentine or naphtha. For example, the spar varnish employed in the above formula was made by adding 54 parts by weight of linseed oil, 1 part of manganese borate, and 5 parts of cobalt drier to 65 parts of hot Congo gum, and diluting with 65 parts of mineral spirits. The coating may be rendered elastic and extensible by the incorporation of suitable plasticizers such as castor oil, benzyl benzoate, dibutyl phthalate, etc., but tricresyl phosphate is ordinarily preferred because of its good physical properties and resistance to attack by acids. The amount of plasticizer specified in the example above is sufficient for a coating which is applied to belting and does not require a high degree of extensibility. Where a more resilient, extensible coating is desired the proportion of plasticizer should be increased.

Other pigments may be substituted wholly or in part for those mentioned above, or the relative proportions of the various pigments may be altered. It is desirable, however, that they include a drier, sulphur, and an inorganic base. The sulphur probably partially vulcanizes the oil and resin contained in the varnish and helps make the coating quick-drying and exceptionally acid-resistant. In the above recipe manganese dioxide is specified as a drier, but obviously manganese resinate, manganese linoleate, lead acetate, lead linoleate, cobalt stearate, or any other drier may be substituted or the drier may all be added to the varnish during its preparation. Likewise other inorganic bases may be substituted for the mixture of litharge, lime, and zinc oxide. For example, magnesia may be employed.

Broadly speaking, the preferred modification of the coating of this invention comprises a mixture of inert pigments 50 to 100 parts by weight, a drier 1 to 5 parts, sulphur 5 to 15 parts, an inorganic base 5 to 15 parts, varnish 150 to 200 parts, and a plasticizer 2 to 15 parts, thinned with a volatile solvent until the desired consistency is attained.

In certain cases it will be found desirable to substitute other coating materials for the varnish base coating described above. A composition which resists the action of alkalies and oils better than oil varnishes comprises chlorinated rubber and a plasticizer. For example, a solution of 100 parts of chlorinated rubber and from 2 to 15 or more parts of a plasticizer such as chlorinated castor oil, dibutyl phthalate, etc. dissolved in 500 to 1,000 parts of benzol or carbon tetrachloride is a very useful coating solution. It is applied over an intermediate layer of a tough heat-plastic rubber isomer as hereinabove described, but need not be dried for as extended a period as the varnish base composition.

While we have herein disclosed with considerable particularity certain preferred manners of performing our invention, we do not thereby desire or intend to limit ourselves solely thereto, for, as hitherto stated, the procedure may be modified, the precise proportions of the materials utilized may be varied and other materials having equivalent chemical properties may be employed if desired without departing from the spirit and scope of the invention as defined in the appended claims.

We claim:

1. An acid-resisting product comprising a fabric-reenforced belt, an intermediate layer of a tough, heat-plastic rubber isomer, and an elastic, extensible, acid-resisting coating comprising a gum-resin, a drying oil, and an inert pigment.

2. An acid-resisting product comprising a fabric-reenforced belt, an intermediate layer of a tough, heat-plastic rubber isomer, and an elastic, extensible, acid-resisting coating comprising a gum-resin, a drying oil, a plasticizer, a drier, and sulphur.

3. An acid-resisting product comprising a fabric-reenforced belt, an intermediate layer of a tough, heat-plastic rubber isomer, and an elastic, extensible, acid-resisting coating comprising a gum-resin, a drying oil, a plasticizer, a drier, sulphur, and an inert pigment.

4. An acid-resisting product comprising a fabric-reenforced belt, an intermediate layer of a tough, heat-plastic rubber isomer, and an elastic, extensible, acid-resisting coating comprising a spar varnish 150 to 200 parts, a plasticizer 2 to 15 parts, an inert pigment 50 to 100 parts, a drier 1 to 5 parts, sulphur 5 to 15 parts, and an inorganic base 5 to 15 parts.

In witness whereof we have hereunto set our hands, said BERT S. TAYLOR this 22nd day of April, 1929, and said BERNARD M. COSTELLO, this 29th day of April, 1929.

BERT S. TAYLOR.
BERNARD M. COSTELLO.